United States Patent [19]

Umemoto et al.

[11] Patent Number: 4,578,436

[45] Date of Patent: Mar. 25, 1986

[54] COATING RESINOUS COMPOSITION CONTAINING SATURATED ALICYCLIC ACID MODIFIED AMPHOTERIC POLYESTER RESIN

[75] Inventors: Hirotoshi Umemoto, Uji; Hisaki Tanabe, Yawata; Akihiro Kanakura, Hirakata; Shinji Nakano, Takatsuki, all of Japan

[73] Assignee: Nippon Paint Co., Ltd., Osaka, Japan

[21] Appl. No.: 608,698

[22] PCT Filed: Sep. 2, 1983

[86] PCT No.: PCT/JP83/00293

§ 371 Date: May 2, 1984

§ 102(e) Date: May 2, 1984

[87] PCT Pub. No.: WO84/00971

PCT Pub. Date: Mar. 15, 1984

[30] Foreign Application Priority Data

Sep. 3, 1982 [JP] Japan .................................. 57-154210

[51] Int. Cl.$^4$ .............................................. C08F 20/00
[52] U.S. Cl. .................................... 525/443; 525/428; 525/440
[58] Field of Search ................ 525/443, 428, 440, 425

[56] References Cited

U.S. PATENT DOCUMENTS 3,668,277 6/1972 Riemhofer et al. ................ 525/443

Primary Examiner—Theodore Pertilla
Attorney, Agent, or Firm—Wenderoth, Lind & Ponack

[57] ABSTRACT

A novel resinous composition used for coating comprising an amphoteric polyester resin whose acidic groups are capable of developing a resinous acid value are controlled in kind and are modified with saturated alicyclic acids and etherified amino-formaldehyde resins. This resinous composition is characterized by having all of the advantages possessed by oil-free polyester resin compositions in respect to weather resistance, the mechanical properties of the coating, interlaminar adhesion and the like, and furthermore, are excellent, inter alia, weather resistance because of be modified with saturated alicyclic acids. Also the curing properties are improved because of the control of the acidic groups and because the resins are amphoteric, they are compatible with melamine resins and have excellent pigment dispersibility. The invention also provides a coating composition containing as a vehicle, the abovementioned resinous composition.

7 Claims, 1 Drawing Figure

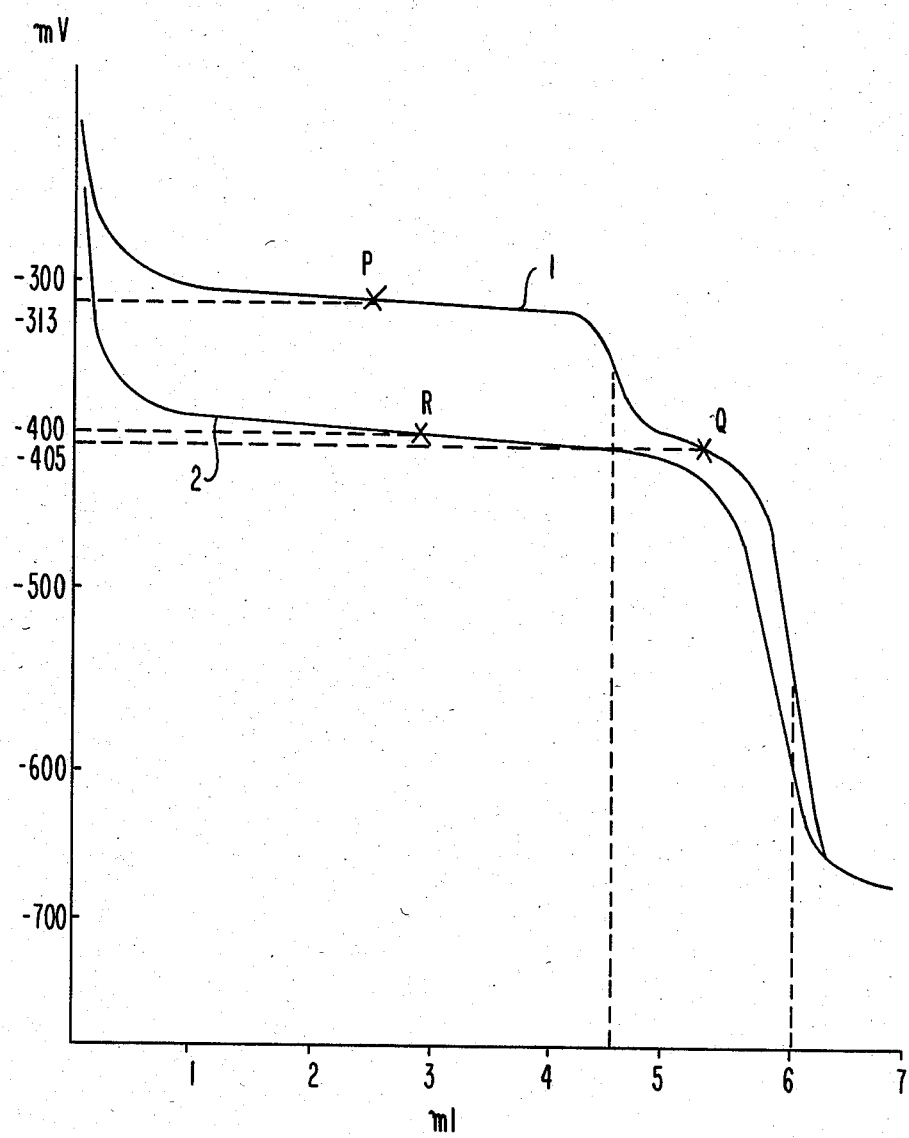

4,578,436

COATING RESINOUS COMPOSITION CONTAINING SATURATED ALICYCLIC ACID MODIFIED AMPHOTERIC POLYESTER RESIN

FIELD OF THE INVENTION

The present invention relates to a resinous composition for coating use and more specifically, to a novel resinous composition comprising a saturated alicyclic acid modified amphoteric polyester resin whose acid groups are capable of developing the resinous acid value are controlled in kind (hereinafter called as acid controlled modified amphoteric polyester resin) and an etherified amino-formaldehyde resin. The resins have all of the advantages possessed by oil-free polyester resinous compositions in respect to weather resistance, mechanical properties of the film, interlaminar adhesion and the like, and which are free of all of the drawbacks possessed by polyester resinous compositions, since the weather resistance is greatly improved by the saturated alicyclic acid modification, the curing properties are enhanced by the control of the kind of acid groups capable of developing the resinous acid value and pigment dispersibility and compatibility with melamine resin are enhanced by the amphoteric characteristics of the resin.

BACKGROUND OF THE INVENTION

Heretofore, as a top coat for automobile bodies and the like, there have been used coating compositions based essentially on amino alkyd resin, amino acrylic resin or the like. However, in the former, though the application characteristics and finishing appearance (gloss, glamorous) are comparatively good, there is the problem of inferior weather resistance, whereas in the latter, although the weather resistance is excellent, there remain questions of inferior finishing appearance, impact resistance and the like.

On the other hand, oil-free polyester/aminoaldehyde resin type coating compositions have been believed to be hardly applicable as top coat was for automobile bodies and the like, because the compositions have difficulties in being applied onto automobile bodies due to the generation of fish eyes, and also exhibit inferior gloss and poor compatibility with amino resins or the like, irrespective of various advantages, such as excellent weather resistance, mechanical properties, inaterlaminar adhesion, and the like.

Poor pigment dispersibility has also been a big factor in keeping such resins from actual use in coating areas.

Recently, various attempts have been made on the oil-free polyester/amino formaldehyde resin type coating composition to make the most of the advantages and overcome the drawbacks possessed by them, thereby making it possible to apply these resins as a top coat for automobile bodies and the like. Among them, particular attention has been concentrated upon saturated alicyclic acid modified polyester resin consisting essentially of oil-free polyesters to which particular amounts of saturated alicyclic polycarboxylic acids are included as an acid component thereof. (see Japanese Patent Application Nos. 94269/79 and 111062/80).

While the abovementioned modified polyester-/aminoaldehyde resin type coating composition may give improved weather resistance and some improvements in such respect to overcoming the drawbacks by the heretofore known oil-free polyester compositions such as the generation of fish eyes and poor compatibility with amino resins, it is hardly possible to say that the abovementioned drawbacks have been thoroughly overcome in that there still remains the question of inferior pigment dispersibility and insufficient curability due to the modification of these resins with alicyclic acid. Therefore, such compositions had not come into practical use.

An object of the invention is, therefore, to provide a polyester base resinous composition for coating use having the merits of heretofore known oil-free polyester/amino resin type coating composition and being free of all of the demerits of using such modified polyester resins as mentioned above.

DISCLOSURE OF THE INVENTION

According to the invention, there is provided a resinous composition for coating use comprising 60 to 90% by weight of polyester resin and 40 to 10% by weight of amino-formaldehyde resin etherified with monohydric alcohol having 1 to 4 carbon atoms, which is characterized in that said polyester resin is an acid controlled modified amphoteric polyester resin obtained by the reaction of polyester resin (A), 10 to 80 mole % of the acid components being occupied by saturated alicyclic polycarboxylic acids and 10 to 100 mole % of the carboxyl groups being capable of developing a resinous acid value being derived from the polycarboxylic acid which may give a titration midpoint potential in a non-aqueous potentiometric titration under such state that resin (A) is capable of developing a resinous acid value of more than $-350$ mV, and a basic resin and/or basic compound (B).

In the present specification and claims, the term "carboxyl groups capable of developing a resinous acid value" shall mean "carboxyl groups capable of developing acid values in the polyester resin"; the term "under a state capable of developing resinous acid value" means a "carboxylic acid under the state of being incorporated into a polyester resin as the sole acid component thereof". Furthermore, the term "polyester resins" shall include both oil-free polyester resin and alkyd resins.

BRIEF EXPLANATION OF DRAWING

FIG. 1 shows non-aqueous potentiometric titration curves of acid controlled modified polyester resinous varnish A (1) and of polyester prepolymer A-1 (2) (Synthetic Example 1).

MOST PREFERRED EMBODIMENTS OF THE INVENTION

The most preferred embodiments of the invention will now be explained.

The polyester resin, which is one component of the present resinous composition, is an acid controlled modified amphoteric polyester resin obtained by the reaction of a modified polyester resin (A), whose carboxyl groups are capable of developing a resinous acid value are controlled in kind and a basic resin and/or a basic compound (B). The modified polyester resin (A) whose carboxyl groups and capable of developing resinous acid value and which are controlled in kind is used as a starting material in the invention is, as minutely stated in Japanese Patent Application filed by the same applicant on Sept. 3, 1982 (under the title of polyester resinous composition and preparation thereof), a modified polyester resin having as acid components saturated alicyclic polycarboxylic acids, polycarboxylic acids whose titration midpoint potential in non-aqueous potentiometric titration, under a state capable of developing a resinous acid value, is more than −350 mV, and optional other poly- and/or mono-carboxylic acids, 10 to 80 mole % of the total acid components being occupied by the aforesaid saturated alicyclic polycarboxylic acids and 10 to 100 mole % of the carboxyl groups capable of developing resinous acid value being derived from the abovementioned polycarboxylic acid whose titration midpoint potential in non-aqueous potentiometric titration, at the state capable of developing resinous acid value is more than −350 mV. Such modified polyester resin (A) whose carboxyl groups capable of developing a resinous acid value are controlled in kind, wherein the acid components consists of a mole of saturated alicyclic polycarboxylic acid (1), b mole(s) of a polycarboxylic acid whose titration midpoint potential in non-aqueous potentiometric titration at the state capable of developing resinous acid value is more than −350 mV (2) and c mole(s) of other poly- and/or mono-carboxylic acid (3) (wherein $a+b+c=1.0$ mole: $0 \leq c$ mole;

$$10 \leq \frac{a}{a+b+c} \times 100 \leq 80 \text{ mole \%})$$

may be preferably and advantageously prepared by the combination steps of reacting an acid mixture of a mole(s) of (1) acid, $(b-b_1)$ mole of (2) acid and c mole(s) of (3) acid, with a polyhydric alcohol to obtain a polyester prepolymer having a resinous acid value of M, in which $$M = N(1-x/100)$$

and then adding $b_1$ mole of (2) acid and continuing the esterification until it reaches a resinous acid value of N. In the abovesaid statement, $b_1$ is equal to b or less than b mole(s) and denotes the amount of (2) acid to be charged in a later stage and determined by the following equation:

$$b_1 = \frac{\frac{x}{100} \times N \times W}{56100} \times \frac{1}{f} \times \frac{1}{1-\frac{P}{100}}$$

wherein N stands for the resinous acid value (KOH mg required for the neutralization of 1 g of resinous solid matter); W is the polyester resin weight; f is the number of functional groups possessed by (B); P is the reaction percentage (%) of (2) at the later charging stage; x is the mole % of (B) occupied in the carboxyl groups capable of developing a resinous acid value and determined in the range of $10 \leq x \leq 100$. Among the said acid components, examples of saturated alicyclic polycarboxylic acid (1) are cyclohexane ring bearing alicyclic acids as, for example, 1,1-cyclohexane dicarboxylic acid, hexahydrophthalic acid and its anhydride, 1,3-cyclohexane dicarboxylic acid, 1,4-cyclohexane dicarboxylic acid, methylhexahydrophthalic acid and its anhydride, hexahydrotrimelliitic acid and its anhydride, and hexahydro-2-methyl-trimellitic acid and its anhydride.

Examples of polycarboxylic acids having the titration midpoint potential in non-aqueous potentiometric titration under a state capable of developing a resinous acid value of more than −350 mV are aromatic polycarboxylic acids such as phthalic anhydride, isophthalic acid, terephthalic acid, trimellitic anhdyride, pyromellitic anhydride and the like. Such polycarboxylic acid per se will, in general, show, when made into an electric potential—TBAH titer curve from the test results of non-aqueous potentiometric titration, a curve having multi-stage inflection points; however, when incorporated into a polyester chain, at least one carboxyl group will remain in a free state and the corresponding curve will have the diminished number of inflection points, accordingly.

Under such conditions, if a polycarboxylic acid is possessed of such acid strength that the aforesaid titration midpoint potential is more than −350 mV, then such a member may advantageously be used for the object of the present invention.

As the acid components, other poly- and/or mono-carboxylic acids (3) than the abovesaid (1) and (2) may be present, if desired. Such acid (3) may be any of the members customarily used as an acid component of polyester resin, including aliphatic or partially saturated alicyclic acids, like succinic acid and its anhydride, adipic acid, azelaic acid, sebacic acid, tetrahydrophthalic anhydride, maleic anhydride, fumaric acid, itaconic acid and the like. Furthermore, monocarboxylic acids, such as benzoic acid, p-t-butyl benzoic acid and the like may be added for the purpose of regulating the molecular weight of the resin. The polyhydric alcohol component to be reacted with said acid mixture is not of a specific type and suitably selected from the members customarily used for the preparation of polyester resins. Examples of such members are ethyleneglycol, diethyleneglycol, propyleneglycol, neopentylglycol, 1,2-butyleneglycol, 1,3-butyleneglycol, 2,3-butyleneglycol, 1,4-butyleneglycol, 1,6-hexanediol, 1,5-pentanediol, 2,5-hexanediol, trimethylolethane, trimethylolpropane, glycerin, pentaerythritol, diglycerin, sorbitol, 1,4-cyclohexane dimethanol and the like.

As already stated, the resin (A), which constitutes the present acid controlled modified amphoteric polyester resinous component, must be of the nature such that 10 to 80 mole% of the total acid components be occupied by said saturated alicyclic polycarboxylic acid and 10 to 100 mole % of the carboxyl groups capable of developing a resinous acid value be derived from polycarboxylic acids having a titration midpoint potential in a non-aqueous potentiometric titration, under a state such that carboxylic acid is capable of developing a resinous acid value, of more than −350 mV. This is because, if the content of saturated alicyclic polycarboxylic acid is less than 10 mole % of the total acid components, weather resistance may not be improved, whereas if it exceeds the upper limit of 80 mole %, the chemical resistance be lowered. As to the ratio of carboxyl groups responsible for the development of the resinous acid value, if the amount of said polycarboxylic acid having the specified acid strength is less than 10 mole %, then there is a general trend towards producing coatings of insufficient gloss and curing properties and hence, the object of the present invention cannot be attained.

It is true that an attempt had been once made to use the combination of an alicyclic polycarboxylic acid and an aromatic carboxylic acid in particular weight ratio (as shown in Japanese Patent Application Kokai No. 36149/82) as the acid components for the synthesis of polyester resins. However, for the reaction with an alcohol component, a carboxylic acid having an alicyclic structure as a cyclohexane ring is less reactive than an aromatic carboxylic acid, and therefore, when the abovesaid mixed acids are reacted with a polyhydric alcohol, a more reactive aromatic carboxylic acid is quickly incorporated into the ester chains, thereby resulting in a polyester resin whose carboxyl groups are capable of developing a resinous acid value are mostly occupied by the abovesaid saturated alicyclic polycarboxylic acid. When the carboxyl groups capable of developing resinous acid value are occupied by such alicyclic carboxylic acids having a lower dissociation degree in non-aqueous solvent, this would be a fatal disadvantage in that the resulted resin is lacking in desired acidity and curability. Under these circumstances, the inventors, adopting the aforesaid specific preparation method, have succeeded in obtaining an ideal acid controlled modified polyester resin, in which 10 to 80 mole % of the acid components are composed of saturated alicyclic polycarboxylic acids, thereby improving the weather resistance of the resin, and 10 to 100 mole % of the carboxyl groups capable of developing a resinous acid value are derived from aromatic polycarboxylic acids having a large dissociation degree and acidity, thereby improving the curability and the weather resistance of the resin. However, even with this acid controlled modified polyester resin, there still remains room for further improvement in pigment dispersibility because of the nature of oil-free polyester resin. Therefore, in the present invention, a device has been made to provide an acid controlled modified amphoteric polyester resin through the addition, condensation or ester-exchange reaction between the abovesaid acid controlled modified polyester resin (A) and a basic resin and/or a basic compound (B).

In the present specification, the term "basic resin and/or basic compound" as used herein denotes a compound having in its molecule at least one functional group (e.g. hydroxyl, active alkoxy, carboxyl, glycidyl, oxirane, alkyleneimine, isocyanate and the like) capable of reacting with that of the polyester (e.g. ester bonding, carboxyl, hydroxyl) and at least one functional group with a nitrogen atom having a lone pair of electrons (e.g. —N<, isocyanate, alkyleneimine group and the like). Among the said compounds, a comparatively higher molecular weight compound is called a basic resin and a comparatively lower molecular weight compound as a basic compound.

Examples of basic resins to be reacted with the acid controlled modified polyester resin (A) are urea resins, melamine resins, polyamide resins, urethane resins and the like and examples of basic compounds are comparatively lower molecular weight compounds of the abovesaid resins or hydroxylamine compounds, such as monoethanolamine, diethanolamine, aminopentanol, aminobenzyl alcohol, 2-dimethylaminoethanol and the like, amino acids, such as 3-dimethylaminobenzoic acid, 2-amino-isobutyric acid, 4-amino-n-butyric acid, alkyleneimines, such as ethyleneimine and the like. The invention, however, cannot be limited to these members only.

Since the acid controlled modified polyester resins are a kind of acidic resins having a hydroxyl group, a carboxyl group or the like, and they can easily be converted to amphoteric resins with both acidic and basic properties through an addition, a condensation or ester exchange reaction with basic resins and/or basic compounds. That is, a polyester resin (acidic resin) and a basic resin or basic compound can be reacted with each other through the functional groups possessed by themselves, as for example, hydroxyl groups, carboxyl groups, active alkoxy groups and the like, or through an intervening crosslinking compound, such as a diisocyanate, a diglycidyl compound and the like.

In regard to the weight ratio of the reactants, i.e. the acid controlled modified polyester resin (A) and the basic resin and/or basic compound (B), there is no particular limit on it providing a resulting satisfactory addition, condensation or ester exchange reaction therebetween. It is, however, generally desirable to react 99.5~40 wt% of the acid controlled modified polyester resin (A) and 0.5~60 wt% of the basic resin or 99.9~50 wt% of the resin (A) and 0.1~50 wt% of the basic compound. As to the details of the preparation of an amphoteric resin by the reaction of such acidic resin and basic resin and/or basic compound, reference should be made to the copending Japanese Patent Application No. 120866/81 filed by the same applicant.

The abovesaid acid controlled modified amphoteric polyester resin, because of the preparation thereof, differs from a mere mixture of an acidic polyester resin and a basic resin, but rather is a reaction product of the said two components and hence is excellent in stability, can never be separated to the respective raw material resins, possesses amphoteric properties and further is excellent in pigment dispersion stability. In this resin, the said acidity and basicity should be preferably be within the values hereinafter stated. However, since the acid controlled modified amphoteric polyester resin is insoluble in water, the inventors have developed original non-aqueous analysis methods and have evaluated the acidity and basicity of the amphoteric resin by use of these methods. That is, the amphoteric polyester resin is first dissolved in pyridine, subjected to a non-aqueous potentiometric titration with a titer of n-tetrabutyl ammonium hydroxide, and the acidity of the resin is determined from the molar amounts of the said reagent necessary for the neutralization thereof. Next, the sample resin is dissolved in acetic acid, subjected to a non-aqueous potentiometric titration with a titer of perchloric acid and the basicity of the resin is determined from the molar amounts of said reagent necessary for the neutralization thereof. As a result of said tests, the inventors have found that the abovesaid acid controlled modified amphoteric polyester resin should preferably have an acidity of $3.0 \sim 2.0 \times 10^{-2}$ m mol/g solid, most preferably $1.0 \sim 5.0 \times 10^{-2}$ m mol/g solid, and a basicity of $1.0 \sim 5 \times 10^{-3}$ m mol/g solid, most preferably $1.0 \sim 1 \times 10^{-2}$ m mol/g solid. This is because, with respect to acidity, if it is less than the lower limit, there is a tendency for the curing properties and film performance to decrease and if it is more than the aforesaid upper limit, there is a tendency for the water resistance and chemical resistance of the film to decrease.

In the present invention, the abovesaid acid controlled modified amphoteric polyester resin is used together with an amino-formaldehyde resin etherified with a monohydric alcohol having 1 to 4 carbon atoms, as, for example, a melamine resin, a guanamine resin, a urea resin and the like. However, to achieve the objectives of the invention, particular preference is given to melamine resins. Also, the compounding ratio of said acid controlled modified amphoteric polyester resin and amino-formaldehyde resin may be in general freely selected, in terms of solid weight ratio, in a range of 60~90 parts by weight, preferably 70~80 parts by weight, of the former, and 40~10 parts by weight, preferably 30~20 parts by weight, of the latter. These figures were determined by repeated experiments.

The thus obtained resinous composition is, when used as solid color coating composition, characterized by having excellent weather resistance, gloss retention and deep color waxing properties. Furthermore, since the modified polyester resin whose carboxyl groups capable of developing resinous acid values are controlled in kind, is amphoterized, it is likewise excellent in compatibility with amino resins, pigment dispersibility (dispersion speed, dispersion stability) and hence in finishing appearance in respect to the gloss and distinctness-of-image and curing properties. Thus, the composition is possessed of all of the characteristics of oil-free polyester coating compositions and is free from the disadvantages thereof, and hence is very useful as coating for automobile bodies and the like.

The invention shall be now fully explained in the following Synthetic Examples, Examples and Comparative Examples. Unless otherwise being stated, all parts are by weight.

SYNTHETIC EXAMPLE 1 (ACID CONTROLLED MODIFIED AMPHOTERIC POLYESTER RESIN SOLUTION I)

Preparation of resinous composition containing acid controlled modified polyester resin, 50 mole % of the acid component being hexahydrophthalic anhydride and 75 mole% of the carboxyl groups capable of developing a resinous acid value of 8 being derived from isophthalic acid.

Composition of acid controlled modified polyester resin A

| | | |
|---|---|---|
| hexahydrophthalic anhydride | 77.4 parts | (0.5 mole) |
| isophthalic acid | 66.48 | (0.4 mole) |
| adipic acid | 14.62 | (0.1 mole) |
| trimethylol propane | 25.61 | |
| neopentylglycol | 52.67 | |
| 1,6-hexanediol | 55.40 | |
| | 292.18 parts | |

Calculation of isophthalic acid to be charged in later stage ($b_1$ mole)

Designed resin:

| | |
|---|---|
| resinous acid value | N = 8.0 |
| polyester resin weight | W = 259.3 |
| number of functional groups in isophthalic acid | f = 2 |
| reaction percentage of later charged isophthalic acid | P = 90% |
| mole % of carboxyl groups derived from isophthalic acid in the total carboxyl groups capable of developing resinous acid value | x = 75 |

Using the abovesaid equation with these datas, $b_1 = 0.139$ mole (23.05 parts)

was obtained.

Into a reaction tank equipped with heating device, stirrer, reflux condenser, water separator, fractional tower and thermometer, were placed the abovesaid six materials and the mixture was heated. At this time, isophthalic acid was used in an amount of 43.43 parts (66.48 − 23.05 = 43.43 parts). At the stage when the materials were fused out, stirring was started and heating was continued until the tank temperature reached to 230° C. However, from 160° C. to 230° C., the temperature was raised at a constant rate in 3 hours. The formed condensation water was distilled out of the system. When the temperature reached 230° C., the tank mixture was maintained at the same temperature for 1 hour and then 5 parts of xylene (refluxing solvent) was gradually added and the condensation reaction was further continued in the presence of said solvent. The reaction was stopped at the stage when the resinous acid value reached to 2.0 calculated by the equation:

$$M = 8.0 (1 - 75/100)$$

and the tank was allowed to cool to 100° C. to obtain a polyester prepolymer A-1. Next, 23.05 parts (0.139 mole) of isophthalic acid was placed in the tank and the tank temperature was raised to 210° C. At this time, from 190° C. to 210° C., said temperature was raised at a constant rate in 1 hour and the formed condensation was was distilled out of the system. When the tank temperature reached 210° C., the tank was maintained at the same temperature to continue the reaction. The said reaction was stopped at the stage when the resinous acid value reached 8.0 and the reaction mixture was allowed to cool. After cooling, 106.1 parts of xylene were added to obtain an acid controlled modified polyester resin solution A, the carboxyl groups capable of developing resinous acid values of said resin being controlled in kind. This solution A had a non-volatile content of 70.1%, a varnish viscosity (Gardner viscosity, at 25° C.) of $Z_1$, and a resinous acid value of 8.1. Using pyridine solutions of thus obtained polyester prepolymer A-1 and of the acid controlled modified polyester resin solution A, a non-aqueous potentiometric titration was carried out with a titration reagent of n-tetrabutyl ammonium hydroxide (TBTM) and the titration curves were shown in FIG. 1.

As is clearly known from the drawing, the titration midpoint potential (R) of the polyester prepolymer A-1 (2) is −400 mV which agrees with the titration midpoint potential of the polyester resin derived from an acid component of hexahydrophthalic anhydride alone as shown in Table 1. It was thus confirmed that the carboxyl groups by which the resinous acid value of the 2.0 of polyester prepolymer A-1 was developed were all derived from the hexahydrophthalic anhydride used.

However, in the titration curve (1) of acid controlled modified polyester resin solution (A), there are 2 inflection points and the titration midpoint potentials (P,Q) are −313 mV and −405 mV, respectively, which are well in accord with the titration midpoint potentials of −310 mV and −400 mV for the polyester resins whose acid components are isophthalic acid alone and hexahydrophthalic anhydride alone as shown in Table 1. Therefore, the carboxyl groups that are contributive to the development of a resinous acid value of 8.1 of the acid controlled modified polyester resin solution A are derived from both isophthalic acid and hexahydrophthalic anhydride, the equivalent ratio of these acids being 75/25.

Thus, it was confirmed that the type of carboxyl groups capable of developing the resinous acid value were surely controlled as indicated under the "designed resin" by x = 75%.

TABLE A

Titration midpoint potentials for various carboxylic acids under a state capable of developing resinous acid values HHPA ... hexahydrophthalic anhydride
AdA ... adipic acid
PAn ... phthalic anhydride
IPHA ... isophthalic acid
TMan ... trimellitic anhydride

| | electric potential (mV) |
|---|---|
| HHPA | −400 |
| AdA | −390 |
| sebacic acid | −420 |
| PAn | −290 |
| IPHA | −310 |
| TMAn | −240 |

To 100 parts of the thus obtained acid controlled modified polyester resin solution A, were added 6 parts of melamine resin (U-20 SE, manufactured by Mitui Toatu K.K., non-volatile content 60%), and 7 parts of xylene and the mixture was heated and reacted at 90°~100° C. until the viscosity (measured by a bubble viscometer) reached Y. The thus obtained acid controlled modified amphoteric polyester resin solution I had an acidity of 0.18 m mol/g solid and a basicity of 0.21 m mol/g solid and a non-volatile content of 65.2%.

SYNTHETIC EXAMPLE 2 (ACID CONTROLLED MODIFIED AMPHOTERIC POLYESTER RESIN SOLUTION II)

Repeating the same procedures as stated in Synthetic Example 1 with the materials shown in Table 1, an acid controlled modified polyester resin solution B was prepared having a non-volatile content of 69.6%, a varnish viscosity of Z~$Z_1$ and a resinous acid value of 7.8.

To 100 parts of the said acid controlled modified polyester resin solution B, was added 7 parts of urea resin (UFR-65, manufactured by Mitui Toatu K.K., non-volatile content more than 98%) and 11.5 parts of xylene, and the mixture was heated and reacted (heat-condensation reaction) at 80°~90° C. until the viscosity (by bubble viscometer) reached Z.

The thus obtained acid controlled modified amphoteric polyester resin solution II had an acidity of 0.17 (m mole/g solid), a basicity of 0.53 (m mole/g solid), and a non-volatile content of 65.1%.

SYNTHETIC EXAMPLE 3 (ACID CONTROLLED MODIFIED AMPHOTERIC POLYESTER RESIN SOLUTION III)

Repeating the same procedures as stated in Synthetic Example 1 with the materials shown in Table 1, there was prepared an acid controlled modified polyester resin solution C, having characteristics such that there non-volatile content was 70.5, the varnish viscosity was $Z_2$~$Z_3$ and the resinous acid value 8.2.

To 100 parts of the thus obtained acid controlled modified polyester resin solution C, was added 10 parts of xylene, and 3.5 parts of isophorone diisocyanate (manufactured by Huels) and the mixture was reacted at 80° C. until the reaction rate of the isocyanate group reached 50% (determined by infrared spectrometer). Though the isophorone diisocyanate do possesses both aliphatic and alicyclic isocyanate groups, since the aliphatic isocyanate group is much more reactive, as high as 10 times, than the alicyclic isocyanate groups, it is believed that at the stage when the reaction rate of isophorone diisocyanate reaches 50%, the aliphatic isocyanates have already been reacted with the hydroxyl groups of the polyester resin, but the alicyclic isocyanates still remain unreacted. In the next place, while keeping the temperature at 80° C., 1.0 part of monoethanolamine was added and reacted with said unreacted isocyanate groups and after confirming the completion of reaction of the whole isocyanate groups by infrared spectrometer, the mixture was allowed to cool to obtain an acid controlled modified amphoteric polyester resin solution III having an acidity of 0.19 (m mole/g solid), a basicity of 0.11 (m mole/g solid) and a non-volatile content of 64.6%.

SYNTHETIC EXAMPLE 4 (ACID CONTROLLED MODIFIED AMPHOTERIC POLYESTER RESIN SOLUTION IV)

Repeating the procedures of Synthetic Example 1 with the materials shown in Table 1, there was prepared an acid controlled modified polyester resin solution D having the following characteristics: a non-volatile content of 70.0%, a varnish viscosity $Z_3$ and a resinous acid value of 7.9.

To 100 parts of the thus obtained acid controlled modified polyester resin solution D, were added 9.0 parts of xylene and 1.4 parts of isophorone diisocyanate (Huels) and the mixture was reacted at 70° C. until the isocyanate reaction rate of 50% (determined by an infrared spectrometer). While keeping the reaction temperature at 70° C., 0.9 part of a polyamide resin (Versamide 140, Henkel Japan, amine value 370~400, viscosity 2~5 poise (75° C.)) and after confirming the complete reaction of the unreacted isocyanate groups and the primary or secondary amino groups of Versamide 140, by means of an infra-red spectrometer, the mixture was allowed to cool to obtain an acid controlled modified amphoteric polyester resin solution IV having an acidity of 0.18 m mole/g solid, a basicity of 0.28 m mole/g solid and a non-volatile content of 64.8%.

SYNTHETIC EXAMPLES 5~7 (MODIFIED POLYESTER RESIN SOLUTIONS V~VII)

According to the prescriptions as given in Table 1, modified polyester resin solutions V~VII (the carboxyl groups capable of developing resinous acid values are not controlled in kind) were prepared by a conventional esterification means of charging the whole materials in one time. The characteristics of these varnishes are shown in Table 1.

SYNTHETIC EXAMPLE 8 (POLYESTER RESIN SOLUTION VIII)

537 Parts of coconut oil, 218 parts of trimethylolethane and 0.3 part of lithium naphthenate were heated to 240° C. and an ester exchange reaction was effected. Next, 174 parts of trimethylolethane, 176 parts of neopentylglycol, 523 parts of phthalic anhydride and 254 parts of isophthalic acid were added and the mixture was heated to 220°~230° C. and a dehydration reaction was effected at the same temperature until the resinous acid value was 5.0. After cooling, the mixture was diluted with 100 parts of a mixed hydrocarbon solvent (Solvesso 100, manufactured by ESSO Standard) and 58 parts of ethyleneglycol monoethylether monoacetate to obtain a polyester resin solution VIII having a viscosity (measured by a bubble viscometer) of U~V, a non-volatile content of 60% and an acidity of 0.10 m mole/g solid.

EXAMPLE 1

Using the acid controlled modified amphoteric polyester resin solution I obtained in Synthetic Example 1 and according to the prescription given below, a white colored dispersion paste was prepared. And then, a white primary colored composition was prepared following the solution formulation hereinunder stated.

TABLE B

| (formulation of white colored dispersion paste) | |
|---|---|
| Titanium white (Note 1) | 60 parts |
| acid controlled modified amphoteric polyester resin solution 1 | 25 |
| Solvesso 100 | 15 |
| Dispersing agent (Note 2) | 0.05 |
| | 100.05 |
| (formulation of white primary colored coating composition) | |
| white colored dispersion paste | 100.05 |
| acid controlled modified amphoteric polyester resin solution I | 42.0 parts |
| Melamine resin (Note 3) | 21.0 |
| n-butanol | 5.0 |
| triethylamine | 0.6 |
| | 168.65 |

(Note 1) Titanium R 5N manufactured by Sakai Kagaku K.K.
(Note 2) 10% KF-69 solution (Shinetsu Silicon K.K.)
(Note 3) Super Beckamine 16-508 (non-volatile content 60%) manufactured by Dainippon Ink K.K.
Acid controlled modified amphoteric polyester resin I/melamine resin = 78/22 (solid ratio)

The thus obtained white primary colored coating compositions was applied by flow coating method onto a glass plate and baked in a hot air drier (140° C.) for 30 minutes.

The pigment dispersibility was evaluated by measuring a 20° mirror gloss, by a Murakami type gloss meter GM-3M, of the coating. The results are shown in Table 2.

EXAMPLES 2~4

Red oxide, Cyanine blue and Anthraquinone red primary colored coating compositions were prepared with the acid controlled modified amphoteric polyester resin solution I obtained in Synthetic Example 1, following the dispersion formulations and the solution formulations given in Tables C, D and E.

TABLE C

| (formulation of red oxide dispersion paste) | |
|---|---|
| Red oxide (Note 4) | 50 parts |
| acid controlled modified amphoteric polyester resin solution I | 30 |
| Solvesso 100 | 20 |
| dispersing agent | 0.05 |
| | 100.05 |
| (formulation of red oxide primary colored coating composition) | |
| red oxide dispersion paste | 100.05 parts |
| acid controlled modified amphoteric polyester resin solution I | 100.0 |
| melamine resin | 43.0 |
| n-butanol | 7.0 |
| triethylamine | 0.7 |
| | 250.75 | acid controlled modified amphoteric polyester resin I/melamine resin = 77/23 (solid ratio)

TABLE D

| (formulation of cyanine blue dispersion paste) | |
|---|---|
| Cyanine blue (Note 5) | 20 parts |
| acid controlled modified amphoteric polyester resin solution I | 56 |
| Solvesso 100 | 30 |
| dispersing agent | 0.05 |
| | 100.05 |
| (formulation of cyanine blue primary colored coating composition) | |
| cyanine blue dispersion paste | 100.05 parts |
| acid controlled modified amphoteric polyester resin solution I | 40 |
| melamine resin | 29 |
| n-butanol | 5 |
| triethylamine | 0.5 |
| | 174.55 | acid controlled modified amphoteric polyester resin I/melamine resin = 78/22 (solid ratio)

TABLE E

| (formulation of anthraquinone red dispersion paste) | |
|---|---|
| Anthraquinone red (Note 6) | 16 parts |
| acid controlled modified amphoteric polyester resin solution I | 34 |
| Solvesso 100 | 50 |
| dispersing agent | 0.05 |
| | 100.05 |
| (formulation of anthraquinone red primary colored coating composition) | |
| Anthraquinone red dispersion paste | 100.05 parts |
| acid controlled modified amphoteric polyester resin solution I | 37.0 |
| melamine resin | 24.0 |
| n-butanol | 5.0 |
| triethylamine | 0.5 |
| | 166.55 | acid controlled modified amphoteric polyester resin I/melamine resin = 76/24 (solid ratio)
(Note 4) Taiyo Red Oxide 501, manufactured by Tone Sangyo K.K.
(Note 5) Fastgen blue 700-3, manufactured by Dainippon Ink K.K.
(Note 6) Chromophthal Red A3B, Ciba-Geigy The thus obtained Red oxide, cyanine blue and anthraquinone red primary colored coating compositions were applied by a flow coating method onto glass plates and baked as in Example 1. The 20° Mirror gloss of the respective coating is shown in Table 2.

EXAMPLES 5~8

White colored, Red oxide colored, Cyanine blue colored and Anthraquinone red colored coating compositions were prepared following the formulation tables B~E of Examples 1~4 but by substituting an acid controlled modified amphoteric polyester resin solution II for the resin solution I. These compositions each was applied on a glass plate by a flow coating method and baked as in Example 1. The 20° Mirror gloss of the respective coating is shown in Table 2.

EXAMPLES 9~12

White, Red oxide, Cyanine blue and Anthraquinone red primary colored coating compositions were prepared by substituting an acid controlled modified amphoteric polyester resin solution III obtained in Synthetic Example 3 for the resin solution I in the formulation tables B~E of Examples 1~4. The thus obtained coating compositions were applied on glass plates and baked as in Example 1 and the measured 20° mirror glosses were shown in Table 2.

EXAMPLES 13~16

White, Red oxide, Cyanine blue and Anthraquinone red primary colored coating compositions were prepared by substituting the acid controlled modified amphoteric polyester resin solution IV obtained in Synthetic Example 4 for the resin solution I in the formulation tables B~E of Examples 1~4. The thus obtained coating compositions were applied on glass plates and baked as in Example 1 and the measured 20° mirror glosses were shown in Table 2.

COMPARATIVE EXAMPLES 1~16

White, Red oxide, Cyanine blue and Anthraquinone red primary colored coating compositions were prepared by substituting acid controlled modified amphoteric polyester resin solution V obtained in Synthetic Example 5, solution VI obtained in Synthetic Example 6, solution VII obtained in Synthetic Example 7 and solution VIII obtained in Synthetic Example 8 for the resin solution I in the formulation tables B~E of Examples 1~4. The thus obtained coating compositions were applied on glass plates and baked as in Example 1 and the measured 20° mirror glosses were shown in Table 2.

Weather resistance, gel fraction and film performance tests were then carried out with the following formulations.

EXAMPLES 17~19

Using each of the primary colored dispersion pastes based on acid controlled modified amphoteric polyester resin solution I obtained in examples 1~4, white colored, red colored and blue colored coating compositions were prepared as shown in the following tables F, G and H.

TABLE F

| formulation of white colored composition | |
|---|---|
| white dispersion paste | 100 |
| blue dispersion paste | 0.02 |
| acid controlled modified amphoteric polyester resin solution I | 60 |
| melamine resin | 30 |
| n-butanol | 2 |
| triethylamine | 0.2 |
| surface conditioner (Note 7) | 0.4 |
| | 192.8 |

TABLE G

| formulation of red colored composition | |
|---|---|
| red dispersion paste | 62 |
| red oxide dispersion paste | 35 |
| white dispersion paste | 3 |
| acid controlled modified amphoteric polyester resin solution I | 115 |
| melamine resin | 53 |
| n-butanol | 5 |
| triethylamine | 0.5 |
| surface conditioner | 0.5 |
| | 274.0 |

TABLE H

| formulation of blue colored composition | |
|---|---|
| blue dispersion paste | 82 |
| white dispersion paste | 18 |
| acid controlled modified amphoteric polyester resin solution I | 203 |
| melamine resin | 92 |
| n-butanol | 8 |
| triethylamine | 0.8 |
| surface conditioner | 0.8 |
| | 404.6 |

(Note 7) 50% Modaflow solution, Monsanto, Chem. Co.

In each formulation, acid controlled modified amphoteric polyester resin I/melamine resin=75/25.

The abovesaid three coating compositions each was diluted with a mixed solvent of 10 parts of toluene, 20 parts of Solvesso 100, 50 parts of a mixed hydrocarbon solvent (Solvesso 150, manufactured by Esso Standard) and 20 parts of butyl acetate, to a viscosity of 23 seconds/No. 4 Ford Cup (20° C.). Onto a Spc-1 dull steel plate previously treated with zinc phosphate, subjected to a cationic electrodeposition and coated with an inter coat, the abovesaid diluted top coat composition was spray-coated and after standing for a defined period of time, the coating was baked at 140° C. for 30 minutes. Weather resistance, gel fraction and film performance tests were carried out with the respective coating and the test results were shown in Table 3.

EXAMPLES 20~28

Using the primary colored dispersion pastes based on the acid controlled modified amphoteric polyester resin solutions II, III and IV obtained in Examples 5~16 and following the prescriptions shown in tables F, G and H (used acid controlled modified amphoteric polyester resin solutions II, II and IV), white colored, red colored and blue colored coating compositions were prepared. As in Examples 17~19, weather resistance, gel fraction and film performance tests were carried out and the test results were shown in Table 3.

COMPARATIVE EXAMPLES 17~28

Using the primary colored dispersion pastes based on the modified polyester resin solutions V, VI and VII and polyester resin solution VIII obtained in Comparative Examples 1~16 and following the prescriptions of tables F, G and H (wherein the acid controlled modified amphoteric polyester resin solution were replaced with each of the modified polyester resin solutions V, VI and VII and the polyester resin solution VIII), white colored, red colored and blue colored coating compositions were prepared. As in Examples 17~19, weather resistance, gel fraction and film performance tests were carried out and the test results were shown in Table 3.

TABLE 1

| (composition & varnish characteristics) | | | |
|---|---|---|---|
| resin solution | Syn. Ex. 1 A | Syn. Ex. 2 B | Syn. Ex. 3 C |
| composition of polyester prepolymer | | | |
| hexahydro phthalic anhyd. | 77.4(0.5) | 71.98(0.465) | 75.85(0.490) |
| isophthalic acid | 43.43(0.261) | 66.48(0.4) | 66.48(0.4) |
| adipic acid | 14.62(0.1) | 14.62(0.1) | 14.62(0.1) |
| trimethylol propane | 25.61 | 25.61 | 25.61 |
| neopentylglycol | 52.67 | 52.67 | 52.67 |
| 1,6-hexanediol | 55.40 | 55.40 | 55.40 |
| later charged polycarboxylic acid (B) and amounts | | | |
| phthalic anhyd. | | 5.19(0.035) | |
| isophthalic acid | 23.05(0.139) | | |
| trimellitic anhyd. | | | 1.97(0.010) |
| figures taken account in the preparation of designated resin | | | |
| polyester resin weight W | 259.30 | 259.07 | 259.72 |
| resinous acid value N | 8.0 | 8.0 | 8.0 |
| functional group number f of later charged (B) | 2 | 2 | 2 |
| reaction % of later | 90 | 60 | 40 |

TABLE 1-continued (composition & varnish characteristics)

| | | | |
|---|---|---|---|
| charged (B) mole % (x) of B in the carboxyl groups capable of develop. resinous acid value | 75 | 75 | 50 |
| Resin solution basic resin or compound | I melamine R. | II urea Resin | III IPDI, ETA |
| varnish characteristics | | | |
| acidity (mmol/g solid) | 0.18 | 0.17 | 0.19 |
| basicity (mmol/g solid) | 0.21 | 0.53 | 0.11 |
| non-vol. (%) | 65.2 | 65.1 | 64.6 |

| resin solution | Syn. Ex. 4 D | Syn. Ex. 5 V | Syn. Ex. 6 VI |
|---|---|---|---|
| composition of polyester prepolymer | | | |
| hexahydro phthalic anhyd. | 30.96(0.2) | 77.4(0.5) | 30.96(0.2) |
| isophthalic acid | 63.48(0.382) | 66.48(0.4) | 116.34(0.7) |
| adipic acid | 14.62(0.1) | 14.62(0.1) | 14.62(0.1) |
| trimethylol propane | 25.17 | 25.61 | 25.17 |
| neopentylglycol | 70.32 | 52.67 | 70.32 |
| 1,6-hexanediol | 60.90 | 55.40 | 60.90 |
| later charged poly-carboxylic acid (B) and amounts | | | |
| phthalic anhyd. | | | |
| isophthalic acid | 52.86(0.318) | | |
| trimellitic anhyd. | | | |
| figures taken account in the preparation of designated resin | | | |
| polyester resin weight W | 254.88 | 259.3 | 254.88 |
| resinous acid value N | 8.0 | 8.0 | 20.0 |
| functional group number f of later charged (B) | 2 | | |
| reaction % of later charged (B) | 95 | | |
| mole % (x) of B in the carboxyl groups capable of develop. resinous acid value | 87.5 | | |
| Resin solution basic resin or compound | IV IPDI, polyamide | | |
| varnish characteristics | | | |
| acidity (mmol/g solid) | 0.18 | 0.20 | 0.55 |
| basicity (mmol/g solid) | 0.28 | 0.006 | 0.005 |
| non-vol. (%) | 64.8 | 69.9 | 69.6 |

| resin solution | Syn. Ex. 7 VII | Syn. Ex. 8 VIII | |
|---|---|---|---|
| composition of polyester prepolymer | | coconut oil | 573 |
| hexahydro phthalic anhyd. | 108.36(0.7) | trimethylolethane | 218 |
| isophthalic acid | | Li naphthenate | 0.3 |
| adipic acid | 49.86(0.3) | phtha. anhyd. | 523 |
| trimethylol propane | 46.70 | isophth. acid | 254 |
| neopentylglycol | 30.82 | trimethylolethane | 174 |
| 1,6-hexanediol | 64.83 | neopentylglycol | 176 |
| later charged poly-carboxylic acid (B) and amounts | | | |
| phthalic anhyd. | | | |
| isophthalic acid | | | |
| trimellitic anhyd. | | | |
| figures taken account in the preparation of designated resin | | | |
| polyester resin weight W | 259.75 | 175.7 | |
| resinous acid value N | 20.0 | 5.0 | |
| functional group number f of later charged (B) | | | |
| reaction % of later charged (B) | | | |
| mole % (x) of B in the carboxyl groups capable of develop. resinous acid value | | | |
| Resin solution basic resin or compound | IPDI, polyamide | | |
| varnish characteristics | | | |
| acidity (mmol/g solid) | 0.54 | 0.10 | |
| basicity (mmol/g solid) | 0.006 | 0.006 | |
| non-vol. (%) | 70.3 | 60.0 | |

TABLE 2 evaluation of dispersion property

| | Example | | | | | | | |
|---|---|---|---|---|---|---|---|---|
| | 1 | 2 | 3 | 4 | 5 | 6 | 7 | 8 |
| resin solution | I | I | I | I | II | II | II | II |
| Prim. color coat. | W | R-1 | Bu | R-2 | W | R-1 | Bu | R-2 |
| 20° mirror gloss | 88 | 75 | 86 | 81 | 84 | 74 | 83 | 80 |

| | Example | | | | | | | |
|---|---|---|---|---|---|---|---|---|
| | 9 | 10 | 11 | 12 | 13 | 14 | 15 | 16 |
| resin solution | III | III | III | III | IV | IV | IV | IV |
| Prim. color coat. | W | R-1 | Bu | R-2 | W | R-1 | Bu | R-2 |
| 20° mirror gloss | 81 | 68 | 81 | 73 | 83 | 70 | 82 | 75 |

| | Comparative Example | | | | | | | |
|---|---|---|---|---|---|---|---|---|
| | 1 | 2 | 3 | 4 | 5 | 6 | 7 | 8 |
| resin solution | V | V | V | V | VI | VI | VI | VI |
| Prim. color coat. | W | R-1 | Bu | R-2 | W | R-1 | Bu | R-2 |
| 20° mirror gloss | 76 | 40 | 75 | 43 | 73 | 41 | 75 | 40 |

| | Comparative Example | | | | | | | |
|---|---|---|---|---|---|---|---|---|
| | 9 | 10 | 11 | 12 | 13 | 14 | 15 | 16 |
| resin solution | VII | VII | VII | VII | VIII | VIII | VIII | VIII |
| Prim. color coat. | W | R-1 | Bu | R-2 | W | R-1 | Bu | R-2 |
| 20° mirror gloss | 76 | 45 | 76 | 42 | 78 | 49 | 76 | 50 |

W = white primary color
R-1 = red oxide primary color
Bu = cyanine blue primary color
R-2 = anthraquinone red primary color

TABLE 3 weather resistance, gel fraction, film performance test results

| | Example | | | | | |
|---|---|---|---|---|---|---|
| | 17 | 18 | 19 | 20 | 21 | 22 |
| resin solution | I | I | I | II | II | II |
| coat. color | white | red | blue | white | red | blue |
| finish. appearance (gloss, thick.)*1 | ⊙ | ○ | ⊙ | ⊙ | ○ | ⊙ |
| 60° mirror gloss*2 | 95 | 93 | 94 | 95 | 94 | 93 |
| pencil hardness | H | H | H | H | H | H |
| impact strength (cm) DuPont type $\Phi = \frac{1}{2}''$ 500 g | 35 | 40 | 40 | 35 | 35 | 35 |
| acid resitance*3 | | | no abnormality | | | |
| alkali resist.*4 | | | no abnormality | | | |
| interlaminar adhesion*5 | 0/100 | 0/100 | 0/100 | 0/100 | 0/100 | 0/100 |
| accelerated weather resis. QUV 300 hrs. 60° gloss retention | 93 | 94 | 92 | 91 | 92 | 92 |
| QUV 600 hrs. 60° gloss retention | 85 | 89 | 83 | 82 | 85 | 84 |
| outdoor exposure (Okinawa) 60° gloss after 18 months | 90 | 88 | 87 | 87 | 85 | 88 |
| waxing reist. after 18 months*6 | — | ○ | ○ | — | ○ | ○ |
| gel fraction*7 | | | | | | |
| baked at 120° C. | 88 | 87 | 88 | 90 | 91 | 90 |
| baked at 140° C. | 94 | 94 | 93 | 95 | 94 | 94 |

| | Example | | | | | |
|---|---|---|---|---|---|---|
| | 23 | 24 | 25 | 26 | 27 | 28 |
| resin solution | III | III | III | IV | IV | IV |
| coat. color | white | red | blue | white | red | blue |
| finish. appearance (gloss, thick.)*1 | ⊙ | ○ | ⊙ | ⊙ | ○ | ⊙ |
| 60° mirror gloss*2 | 94 | 93 | 92 | 94 | 92 | 89 |
| pencil hardness | H | H | H | H | H | H |
| impact strength (cm) DuPont type $\Phi = \frac{1}{2}''$ 500 g | 35 | 35 | 40 | 35 | 35 | 35 |
| acid resitance*3 | | | no abnormality | | | |
| alkali resist.*4 | | | no abnormality | | | |
| interlaminar adhesion*5 | 0/100 | 0/100 | 0/100 | 0/100 | 0/100 | 0/100 |
| accelerated weather resis. QUV 300 hrs. 60° gloss retention | 94 | 91 | 92 | 91 | 93 | 90 |
| QUV 600 hrs. 60° gloss retention | 86 | 83 | 88 | 86 | 84 | 85 |
| outdoor exposure (Okinawa) 60° gloss after 18 months | 86 | 83 | 87 | 88 | 86 | 85 |
| waxing reist. after 18 months*6 | — | ○ | ○ | — | ○ | ○ |
| gel fraction*7 | | | | | | |
| baked at 120° C. | 91 | 90 | 91 | 90 | 89 | 89 |
| baked at 140° C. | 96 | 95 | 95 | 94 | 95 | 94 |

| | Comparative Example | | | | | |
|---|---|---|---|---|---|---|
| | 17 | 18 | 19 | 20 | 21 | 22 |
| resin solution | V | V | V | VI | VI | VI |
| coat. color | white | red | blue | white | red | blue |
| finish. appearance (gloss, thick.)*1 | ○ | X | ○ | ○ | X | ○ |
| 60° mirror gloss*2 | 91 | 80 | 90 | 91 | 78 | 92 |
| pencil hardness | FH | FH | FH | H | F | F |
| impact strength (cm) DuPont type $\Phi = \frac{1}{2}''$ 500 g | 35 | 30 | 30 | 30 | 30 | 30 |
| acid resitance*3 | a | c | c | c | c | c |
| alkali resist.*4 | b | a | a | b | a | a |
| interlaminar adhesion*5 | 0/100 | 0/100 | 0/100 | 0/100 | 0/100 | 0/100 |
| accelerated weather resis. QUV 300 hrs. 60° gloss retention | 80 | 82 | 79 | 82 | 79 | 77 |
| QUV 600 hrs. 60° gloss retention | 73 | 76 | 74 | 77 | 70 | 74 |
| outdoor exposure (Okinawa) 60° gloss after 18 months | 76 | 75 | 76 | 78 | 71 | 73 |
| waxing reist. after | — | Δ | ○ | — | ○ | ○ |

TABLE 3-continued weather resistance, gel fraction, film performance test results 18 months*6
gel fraction*7

| | | | | | | |
|---|---|---|---|---|---|---|
| baked at 120° C. | 80 | 79 | 80 | 83 | 84 | 82 |
| baked at 140° C. | 91 | 91 | 88 | 92 | 90 | 91 |

| | Comparative Example | | | | | |
|---|---|---|---|---|---|---|
| | 23 | 24 | 25 | 26 | 27 | 28 |
| resin solution | VII | VII | VII | VIII | VIII | VIII |
| coat. color | white | red | blue | white | red | blue |
| finish. appearance (gloss, thick.)*1 | ○ | X | ○ | ⊙ | Δ | ○ |
| 60° mirror gloss*2 | 91 | 73 | 91 | 93 | 85 | 88 |
| pencil hardness | FH | FH | FH | HB | HB | HB |
| impact strength (cm) DuPont type Φ = ½" 500 g | 35 | 30 | 35 | 35 | 40 | 40 |
| acid resistance*3 | a | c | c | a | c | c |
| alkali resist.*4 | b | a | a | b | a | a |
| interlaminar adhesion*5 | 0/100 | 0/100 | 0/100 | 0/100 | 0/100 | 0/100 |
| accelerated weather resis. QUV 300 hrs. 60° gloss retention | 81 | 80 | 80 | 34 | 73 | 64 |
| QUV 600 hrs. 60° gloss retention | 73 | 74 | 73 | 13 | 51 | 46 |
| outdoor exposure (Okinawa) 60° gloss after 18 months | 73 | 71 | 75 | 66 | 54 | 62 |
| waxing reist. after 18 months*6 | — | ○ | ○ | — | X | Δ |
| gel fraction*7 | | | | | | |
| baked at 120° C. | 83 | 80 | 82 | 88 | 87 | 89 |
| baked at 140° C. | 90 | 91 | 93 | 95 | 93 | 94 | a . . . some discolor
b . . . discolor, blister
c . . . no abnormality

Test methods and evaluation standards
(Note 1) Finishing appearance:
The finishing appearance was evaluated by visual observation of the gloss and the thickness on the basis of the following criteria:
⊙ . . very good
○ . . . good
Δ . . . slightly inferior
X . . . no good
(Note 2) 60° (mirror) gloss
60° reflectance was measured by using a Murakami type glossmeter GM-3M
(Note 3) Acid resistance
5 ml of N/10 $H_2SO_4$ was dropped in a glass cylinder (inner diam. of 38 mm, height of 15 mm) and placed on the coating. After standing for 24 hours at 20° C., the coating was washed with water and any occurence of wrinkles, blisters and color changes were observed.
(Note 4) Alkali resistance
5 ml of N/10 NaOH was dropped in a glass cylinder as used in the abovesaid test, and placed on the coating and after standing in a drier (55° C.) for 4 hours and subsequently washing with water, any occurence of wrinkles, blisters and color changes were observed.
(Note 5) Interlaminar adhesion
Onto a substrate, the coating composition obtained in each Example was applied and baked at 160° C. for 30 minutes. Thereafter, the same coating composition was spray-coated as a top coat and baked at 140° C. for 30 minutes (2 coats with the same coating composition). Thereafter, cros-cuts with 2 mm width cut were made with a razer and peel test was carried out with a cellophane tape. The result was evaluated by the number of peeled out coatings in 2 cm square each.
(Note 6) Waxing resistance
A small quantity of car wax (Soft 99 semi-kneaded type, manufactured by Nitto Chem. Co.) was taken on a white linen and rubbed against the coating intensely with the forefinger 10 times back and forth over a distance of 10 cm. An excess amount of wax remained on the coating was wiped out with a fresh linen cloth and the coating surface was visually observed. The result was evaluated from the extent of gloss down, abrasions and coloring of white linen cloth.
○ . . . no gloss down and abrasions on the coating and no coloring of white linen
Δ . . . slight gloss down and abrasions, and some coloring of white linen
X . . . considerable gloss down and abrasions, and marked coloring white linen
(Note 7) Gel fraction TABLE 3-continued weather resistance, gel fraction, film performance test results Sample specimen of baked coating was subjected to solvent extraction with acetone/methanol = 1/1 (weight), using Soxhlet-extractor, at 70° C. for 5 hours, and the extract was dried at 120° C. for 30 minutes in a drier, and then cooled in a dessicator. The extract was weighed and gel fraction was calculated from the said result.

SYNTHETIC EXAMPLE 9 (ACID CONTROLLED MODIFIED AMPHOTERIC POLYESTER RESIN SOLUTION IX)

An acid controlled modified polyester resin solution E was prepared by using the same method as stated in Synthetic Example 1 and following the prescription given in Table 4. The characteristics of the thus obtained varnish were as follows: the non-volatile content was 70.2%, the varnish viscosity was Y-Z and the resinous acid value was 7.9.

To 100 parts of the thus obtained acid controlled modified polyester resin solution E, 6 parts of melamine resin U-20 SE (non-volatile content 60%, manufactured by Mitui Toatu K.K.) and the mixture was reacted as in Synthetic Example 1 to obtain an acid controlled modified amphoteric polyester resin solution IX having the characteristics of a varnish viscosity $Z_2$, an acidity 0.20 (m mol/g solid), a basicity 0.21 (m mol/g solid) and non-volatile content 70.0%.

SYNTHETIC EXAMPLE 10 (ACID CONTROLLED MODIFIED AMPHOTERIC POLYESTER RESIN X)

An acid controlled modified polyester resin solution F was prepared by using the same method as stated in Synthetic Example 1 and following the prescription shown in Table 4. This varnish had the characteristics of a non-volatile content of 70.5%, a varnish viscosity W-X and a resinous acid value 7.8. To 100 parts of the thus obtained acid conatrolled modified polyester resin solution F, 6 parts of melamine resin U-20SE (non-volatile content 60%, manufactured by Mitui Toatu K.K.) was added and reacted as in Synthetic Example 1. An acid controlled modified amphoteric polyester resin solution X having the characteristics of a varnish viscosity Z, an acidity 0.19 (m mol/g solid), a basicity 0.21 (m mol/g solid) and a non-volatile content 70.1% was obtained.

EXAMPLES 29~36

White, red oxide, cyanine blue and anthraquinone primary colored coating compositions were prepared by following the formulations given in tables B~E of Examples 1~4, but substituting the acid controlled modified amphoteric polyester resin solutions IX and X obtained in Synthetic Examples 9 and 10 for the resin solution I. These compositions each were applied onto a glass plate by a flow coating method and baked as in Example 1 and the 20° mirror gloss of the baked coating was shown in Table 5, respectively.

EXAMPLES 37~42

Using the primary colored dispersion pastes based on the acid controlled modified amphoteric polyester resin solutions IX and X obtained in Examples 29~36 and following the prescriptions given in Tables F, G and H (used IX and X as acid controlled modified amphoteric polyester resin solution), white colored, red colored and blue colored coating compositions were prepared. For the respective compositions, the weather resistance, the gel fraction and the film performance were tested as in Examples 17~19 and the results obtained were shown in Table 6.

The test methods and evaluation standards are as stated hereinbefore.

POSSIBILITY OF INDUSTRIAL USE

As stated hereinabove, the present resinous composition can afford, when used as resinous vehicle in a clear or colored coating composition, excellent coating in respect to weather resistance, mechanical properties and interlaminar adhesion, and especially curing property, pigment dispersibility and compatibility with melamine resins, and hence the resinous composition of the present invention is very useful as a top coat for automobile bodies and the like.

TABLE 4

|  | Example | |
|---|---|---|
|  | 9 | 10 |
| resin solution | E | F |
| coconut oil | 30.11 | 117.9 |
| hexahydro phtha. anhyd. | 46.44(0.3) | 46.44(0.3) |
| isophthalic acid | 91.11(0.55) | 83.1(0.5) |
| trimethylolpropane | 28.96 | 70.51 |
| neopentylglycol | 82.39 | 43.89 |
| 1,6-hexanediol | 17.50 | 9.08 |
| later charged acid (B) and amounts thereof figures determined at the preparation of resin | isophthalic acid 25.23(0.15) | isophthalic acid 33.24(0.2) |
| polyester resin weight W | 283.9 | 370.5 |
| resinous acid value N | 8.0 | 8.0 |
| number of functional groups f of later charged (B) | 2 | 2 |
| reaction % thereof | 90.0 | 90.0 |
| mole % x of (B) occupied in the total carboxyl groups that develope resinous acid value | 75 | 75 |
| resin solution | IX | X |
| basic resin or compound | melamine resin | melamine resin |
| varnish characteristics |  |  |
| acidity (mmol/g solid) | 0.20 | 0.19 |
| basicity (mmol/g solid) | 0.21 | 0.21 |
| NV content % | 70.0 | 70.1 |

( ) indicates mole

TABLE 5

|  | Example No. | | | | | | | |
|---|---|---|---|---|---|---|---|---|
|  | 29 | 30 | 31 | 32 | 33 | 34 | 35 | 36 |
| resin solution | IX | IX | IX | IX | X | X | X | X |
| prim. color coat. | W | R-1 | Bu | R-2 | W | R-1 | Bu | R-2 |
| 20° mirror gloss | 87 | 75 | 86 | 82 | 88 | 76 | 86 | 83 |

TABLE 6

|  | Example No. | | | | | |
|---|---|---|---|---|---|---|
|  | 37 | 38 | 39 | 40 | 41 | 42 |
| resin solution | IX | IX | IX | X | X | X |
| coating color | W | R | Bu | W | R | Bu |

TABLE 6-continued

| | Example No. | | | | | |
|---|---|---|---|---|---|---|
| | 37 | 38 | 39 | 40 | 41 | 42 |
| finishing appearance*1 | ⊙ | ○ | ⊙ | ⊙ | ⊙ | ⊙ |
| 60° mirror gloss*2 | 95 | 93 | 95 | 96 | 94 | 95 |
| pencil hardness | FH | FH | FH | HB | HB | HB |
| impact strength (cm) DuPont type Φ = ½" 500 g | 35 | 35 | 35 | 40 | 40 | 40 |
| acid resistance*3 | no abnormality | | | | | |
| alkali resistance*4 | no abnormality | | | | | |
| interlaminar adhesion*5 | 0/100 | | | | | |
| accelerated weather resist. | | | | | | |
| 60° gloss retention after QUV 300 hours | 92 | 93 | 91 | 92 | 90 | 91 |
| 60° gloss retention after QUV 600 hours | 84 | 88 | 83 | 85 | 83 | 82 |
| outdoor exposure (Okinawa) | 89 | 87 | 87 | 87 | 85 | 86 |
| 60° gloss after 18 months waxing resistance after 18 months*6 | — | ○ | ○ | — | ○ | ○ |
| gel fraction*7 | | | | | | |
| baking temp. 120° C. | 88 | 86 | 87 | 89 | 88 | 89 |
| baking temp. 140° C. | 94 | 93 | 93 | 95 | 93 | 94 |

What is claimed is:

1. A coating use resinous composition comprising 60~90% by weight of amphoteric polyester resin obtained by the reaction of polyester resin (A) comprising alcohol and acid components, 10~80 mole % of the acid components being a saturated alicyclic polycarboxylic acid and 10~100 mole % of the carboxyl groups capable of developing a resinous acid value, said carboxyl groups being derived from a polycarboxylic acid showing a titration midpoint potential in a non-aqueous potentiometric titration, under a state capable of developing a resinous acid value, of more than −350 mV, and (B) a member selected from the group consisting of a basic resin and a basic compound or mixtures thereof, and 40~10% by weight of an amino-formaldehyde resin etherified with monohydric alcohol having 1 to 4 carbon atoms, said basic resin and basic compound both containing in its molecule at least one function group capable of reacting with the ester and at least one functional group with a nitrogen atom having a lone pair of electrons.

2. The composition according to claim 1 wherein the amphoteric polyester resin has an acidity of $2.0 \times 10^{-2} \sim 3.0$ m mol/g solid and a basicity of $1.0 \times 10^{-2} \sim 1.0$ m mol/g solid.

3. The composition according to claim 1 or claim 2 wherein the amphoteric polyester resin is the resin obtained by the reaction of 99.5~40 wt%, in terms of resinous solid amounts, of (A) resin and 0.5~60 wt% of (B) resin or 99.9~50 wt% of (A) resin and 0.1~50 wt% of (B) basic compound.

4. The composition according to claim 1 wherein the polycarboxylic acid showing a titration midpoint potential in a non-aqueous potentiometric titration, under a state capable of developing a resinous acid value of more than −350 mV, is selected from the group consisting of phthalic anhydride, isophthalic acid, terephthalic acid, trimellitic anhydride and pyromellitic anhydride.

5. The composition according to claim 4 in which the alicyclic polycarboxylic acid in the polyester (A) is selected from the group consisting of 1,1-cyclohexane dicarboxylic acid, hexahydrophthalic acid and its anhydride, 1,3-cyclohexane dicarboxylic acid, 1,4-cyclohexane dicarboxylic acid, methylhexahydrophthalic acid and its anhydride, hexahydrotrimellitic acid and its anhydride, and hexahydro-2-methyl-trimellitic acid and its anhydride.

6. The composition according to claim 1 wherein the polyester is produced by the reaction of a polyol selected from the group consisting of ethyleneglycol, diethyleneglycol, propyleneglycol, neopentylglycol, 1,2-butyleneglycol, 1,3-butyleneglycol, 2,3-butyleneglycol, 1,4-butyleneglycol, 1,6-hexanediol, 1,5-pentanediol, 2,5-hexanediol, trimethylolethane, trimethylolpropane, glycerin, pentaerythritol, diglycerin, sorbitol, and 1,4-cyclohexane dimethanol, an alicyclic acid selected from the group consisting of 1,1-cyclohexane dicarboxylic acid, hexahydrophthalic acid and its anhydride, 1,3-cyclohexane dicarboxylic acid, 1,4-cyclohexane dicarboxylic acid, methylhexahydrophthalic acid and its anhydride, hexahydrotrimellitic acid and its anhydride, and hexahydro-2-methyl-trimellitic acid and its anhydride, and a polycarboxylic acid showing a titration midpoint potential in a non-aqueous potentiometric titration, under a state capable of developing resinous acid value of more than −350 mV, selected from the group consisting of phthalic anhydride, isophthalic acid, terephthalic acid, trimellitic anhydride, and pyromellitic anhydride.

7. The composition according to claim 6 wherein member (B) is selected from the group consisting of urea resins, melamine resins, polyamide resins, urethane resins, monoethanolamine, diethanolamine, aminopentanol, aminobenzyl alcohol, 2-dimethylaminoethanol, 3-dimethylaminobenzoic acid, 2-amino-isobutyric acid, 4-amino-n-butyric acid, and ethyleneimine.

* * * * *